(12) United States Patent  
Kuroda

(10) Patent No.: US 8,068,293 B2
(45) Date of Patent: Nov. 29, 2011

(54) PROJECTION LENS UNIT

(75) Inventor: Yasuto Kuroda, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/646,254

(22) Filed: Dec. 23, 2009

(65) Prior Publication Data

US 2010/0177410 A1 Jul. 15, 2010

(30) Foreign Application Priority Data

Jan. 14, 2009 (JP) ................. P2009-005567

(51) Int. Cl.
G02B 7/02 (2006.01)

(52) U.S. Cl. ...................................... 359/819

(58) Field of Classification Search .......... 359/699–704, 359/819; 353/100, 101; 396/529
See application file for complete search history.

(56) References Cited

U.S. PATENT DOCUMENTS 6,195,209 B1 * 2/2001 Kreitzer et al. ............... 359/649
7,471,464 B2 * 12/2008 Kageyama ..................... 359/699
2007/0024989 A1 2/2007 Kageyama

FOREIGN PATENT DOCUMENTS

JP 2007-25579 A 2/2007
JP 2007-41157 A 2/2007

* cited by examiner

Primary Examiner — Scott J Sugarman
Assistant Examiner — Tuyen Tra
(74) Attorney, Agent, or Firm — Birch, Stewart, Kolasch & Birch, LLP

(57) ABSTRACT

A projection lens unit includes: a projection lens having a first optical system for focusing incident image light and also having a second optical system for magnifying and projecting the image light focused by the first optical system; a lens barrel member for accommodating the projection lens and having a small diameter portion in which a joining portion of the first and the second optical system is formed to be the thinnest; a holding member having a first holding face on which the small diameter portion is mounted; and a presser member having a second holding face which holds the small diameter portion together with the first holding face. The holding member is fixed to a housing on which the projection lens unit is mounted. The presser member does not protrude upward from the lens barrel member arranged in a dead space of the small diameter portion.

3 Claims, 6 Drawing Sheets

PROJECTION LENS UNIT

The present application claims priority from Japanese Patent Application No. 2009-0005567 filed on Jan. 14, 2009, the entire content of which is incorporated herein by reference.

BACKGROUND OF INVENTION

1. Field of the Invention

The present invention relates to a projection lens unit mounted on a portable type ultra-small projector and projecting an image, which is formed by an image forming apparatus, on a screen.

2. Description of the Related Art

Recently, portable type electronic apparatus have come into wide use in which a light projector is incorporated into a personal computer, a mobile phone or a digital camera so that a projecting function can be added in addition to the original function of the electronic apparatus. Further, portable type ultra-small projectors, on which only the projecting function is mounted, have been on the market. There is a strong demand of reducing the sizes of the light projectors incorporated into those portable type electronic apparatus. Especially, a reduction of the thickness of the apparatus is the most important task. In general, when consideration is given to mounting a projection lens on a housing of the light projector, a size of the holding portion, on which a projection lens for projecting an image on a screen is mounted, is inevitably increased and becomes larger than the size of a lens barrel portion. Accordingly, this portion has a great influence on the size and thickness of the overall apparatus. For example, as shown in FIG. 6, the lens barrel portion is composed as follows. In an outer circumferential portion on the incident side of the projection lens barrel 50, the flange portion 53 having the mounting face 52, which is perpendicular to the lens optical axis 51, is provided so that the lens optical axis 51 of the projection lens barrel 50 can be maintained to be highly accurately perpendicular to the mounting face of the apparatus.

Since a plurality of lenses are incorporated into such a projection lens barrel, it is necessary to adjust a focus after the lenses have been incorporated. Further, such a problem may be caused that the focusing position is shifted because of rattling of the lens caused by the vibration in the process of conveyance. In preparation for the occurrence of such a problem, a structure, by which an adjustment can be easily made again, is disclosed in the following JP-A-2007-025579 and JP-A-2007-041157.

SUMMARY OF INVENTION

In the related lens barrel holding structure shown in FIG. 6, the flange portion becomes necessarily larger than the lens barrel portion. Accordingly, a size of the apparatus in which the lens barrel portion is accommodated is increased. Because of the increased size, a commodity value of the portable small projector, which is made on the assumption that the projector is carried, is lowered, which is a big problem.

The present invention has been accomplished to solve the above problems. The present invention proposes a structure of holding the projection lens without providing a flange portion, which is used for holding, in the lens barrel portion. That is, the present invention proposes a projection lens unit in which the lens barrel can be held without increasing the size in the thickness direction of the small projector.

The projection lens unit of the present invention comprises: a projection lens for projecting an image on a screen after incident image light has been focused and magnified; a lens barrel member for accommodating the projection lens, wherein the outline portion of the lens barrel member corresponding to the position where the image light has been focused is formed to be thinnest; a holding member having a first holding face on which the outline portion of the lens barrel member formed to be thinnest is mounted; and a presser member having a second holding face for holding the outline portion of the lens barrel member formed to be thinnest when the outline portion of the lens barrel member is interposed between the first holding face and the second holding face.

The projection lens described above includes: a first optical system for focusing incident image light; and a second optical system for magnifying and projecting the focused image light on the screen, wherein a pupil position at which the image light is focused exists between the first optical system and the second optical system and the outline portion of the lens barrel member formed to be thinnest contains the pupil position. It is preferable that the projection lens is a fixed focus lens, the movement of the pupil position of which is short and that a ratio of the projection distance to the size of the projection image is constant.

The thinnest portion of the lens barrel of the projection lens unit of the present invention is fixed. Therefore, the lens barrel can be simply held while the optical axis position is being maintained with high accuracy. Since a flange for holding the lens barrel is not provided, there is no possibility that the size of the small projector in the thickness direction is increased so as to hold the lens barrel.

DESCRIPTION OF EXEMPLARY EMBODIMENTS

Figure 1:
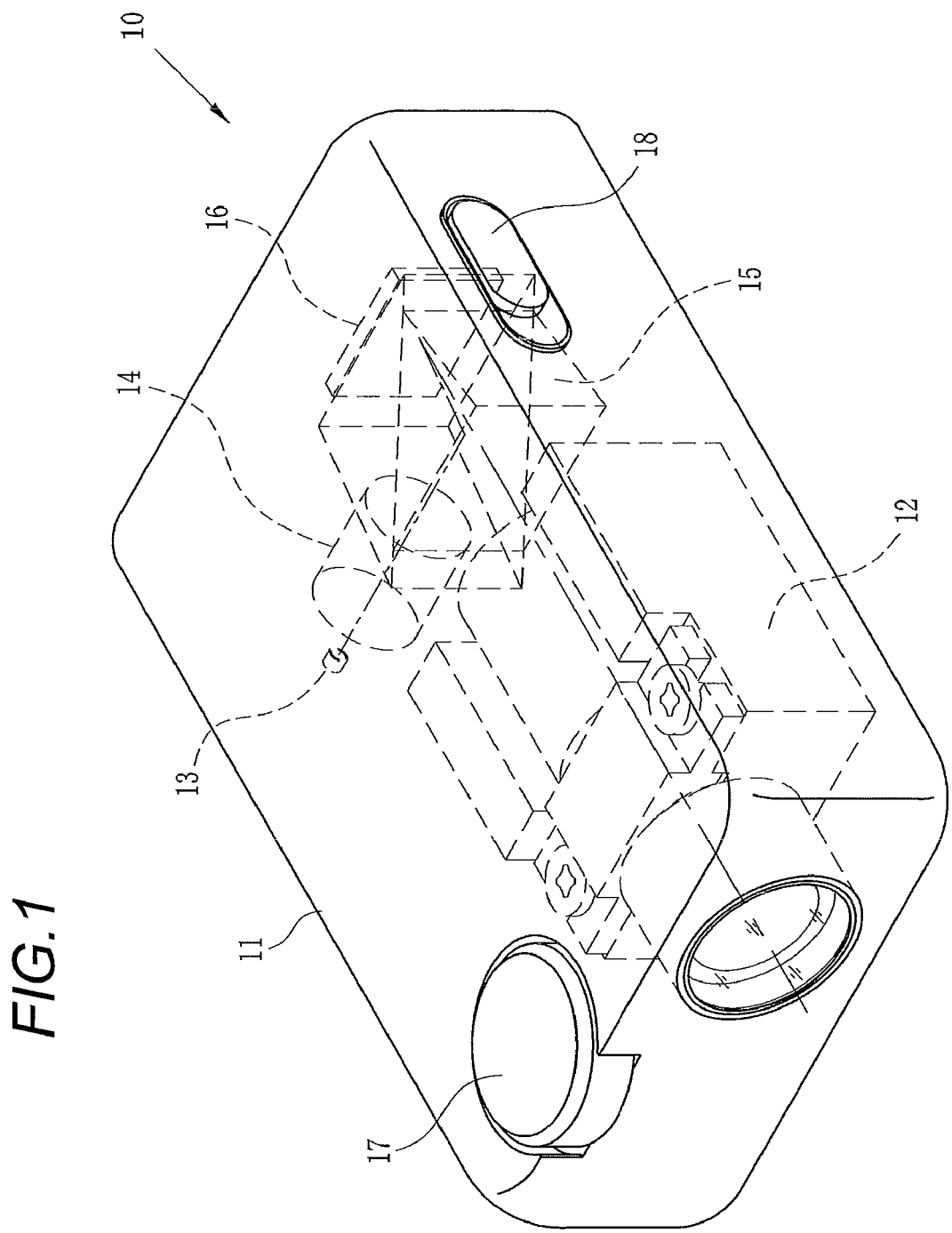
FIG. 1 is a perspective view of a portable type small projector on which the projection lens unit of the present invention is mounted.

As shown in FIG. 1, the portable type small projector 10 is composed as follows. The housing 11, which is formed to be a substantial rectangular parallelepiped, accommodates a projection lens unit 12 of the present invention, an LED 13 which is used as a light source, an illumination optical system 14, a total internal reflection prism 15, and a reflection type LCD 16 which will be referred to as an LCD hereinafter. The focus adjusting dial 17, which adjusts the focus of an image projected on a screen by moving a portion of the lens composing the optical system of the projection lens unit 12, and the power switch 18 are provided so that the operating portions can be exposed from the housing 11. Light emitted from the LED 13 transmits the illumination optical system 14, which includes a filter and an integrator, and is incident on the total internal reflection prism 15, so that the light is formed to be image light containing an image displayed by the LCD 16. The thus formed image light is projected on a screen by the projection lens unit 12. Instead of the LCD 16, the transmission type LCD or DMD (Digital Micro-mirror Device) may be used, that is, any type light bulb may be used. Since members except for the projection lens unit 12 are of the related technology, the detailed explanations are omitted here.

Figure 2:
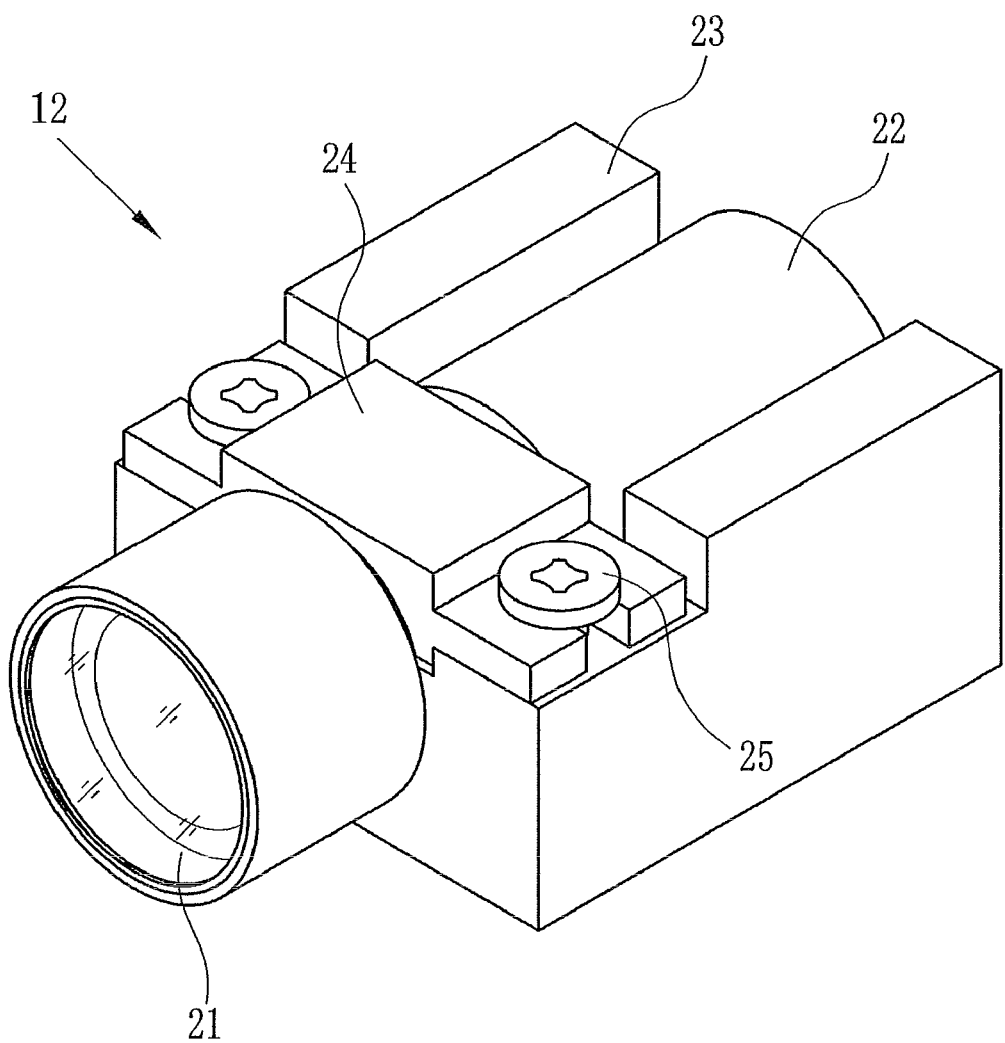
FIG. 2 is a perspective appearance view of the projection lens unit of the present invention.
Figure 3:
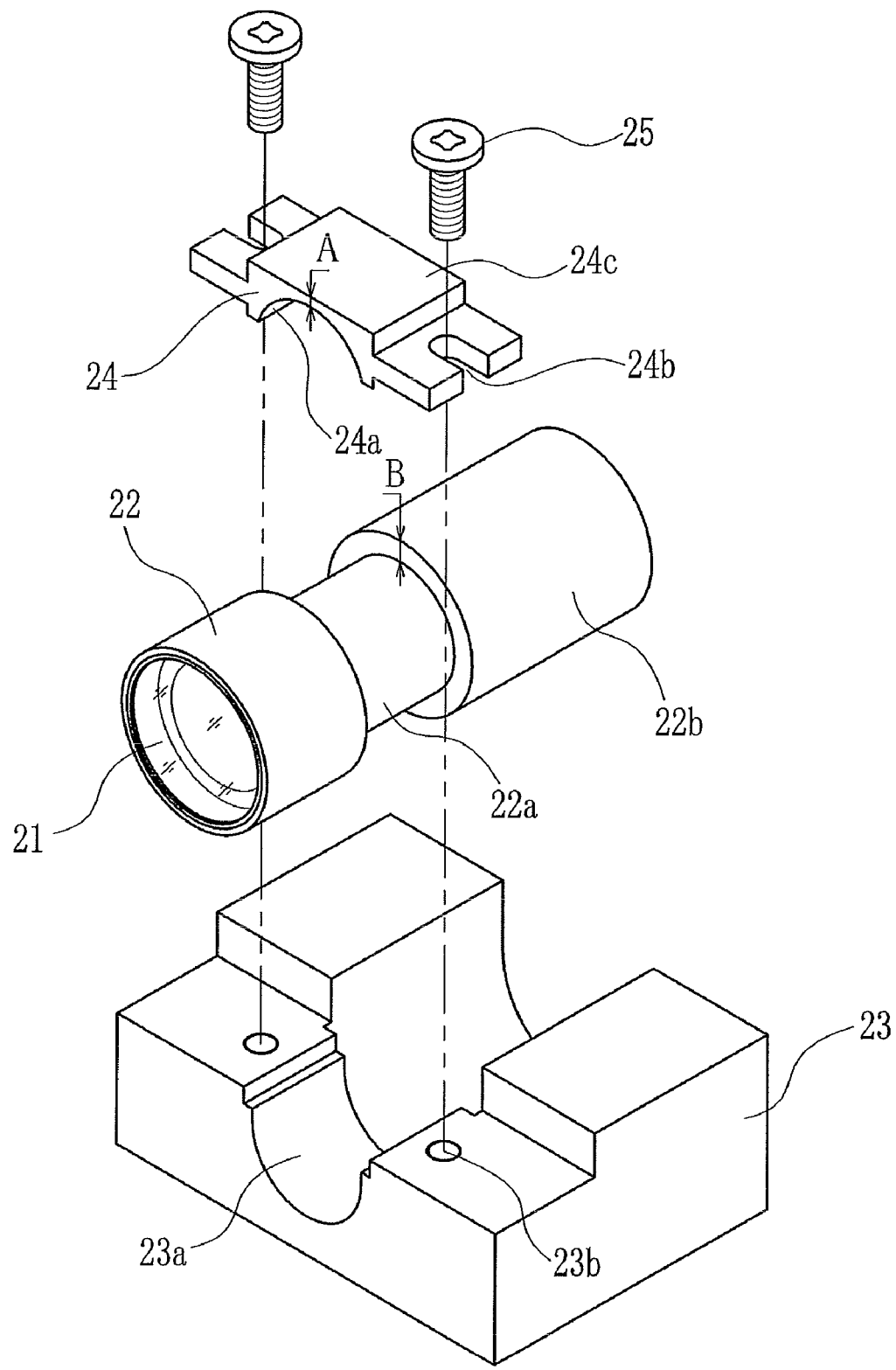
FIG. 3 is an exploded view of the projection lens unit.
Figure 5:
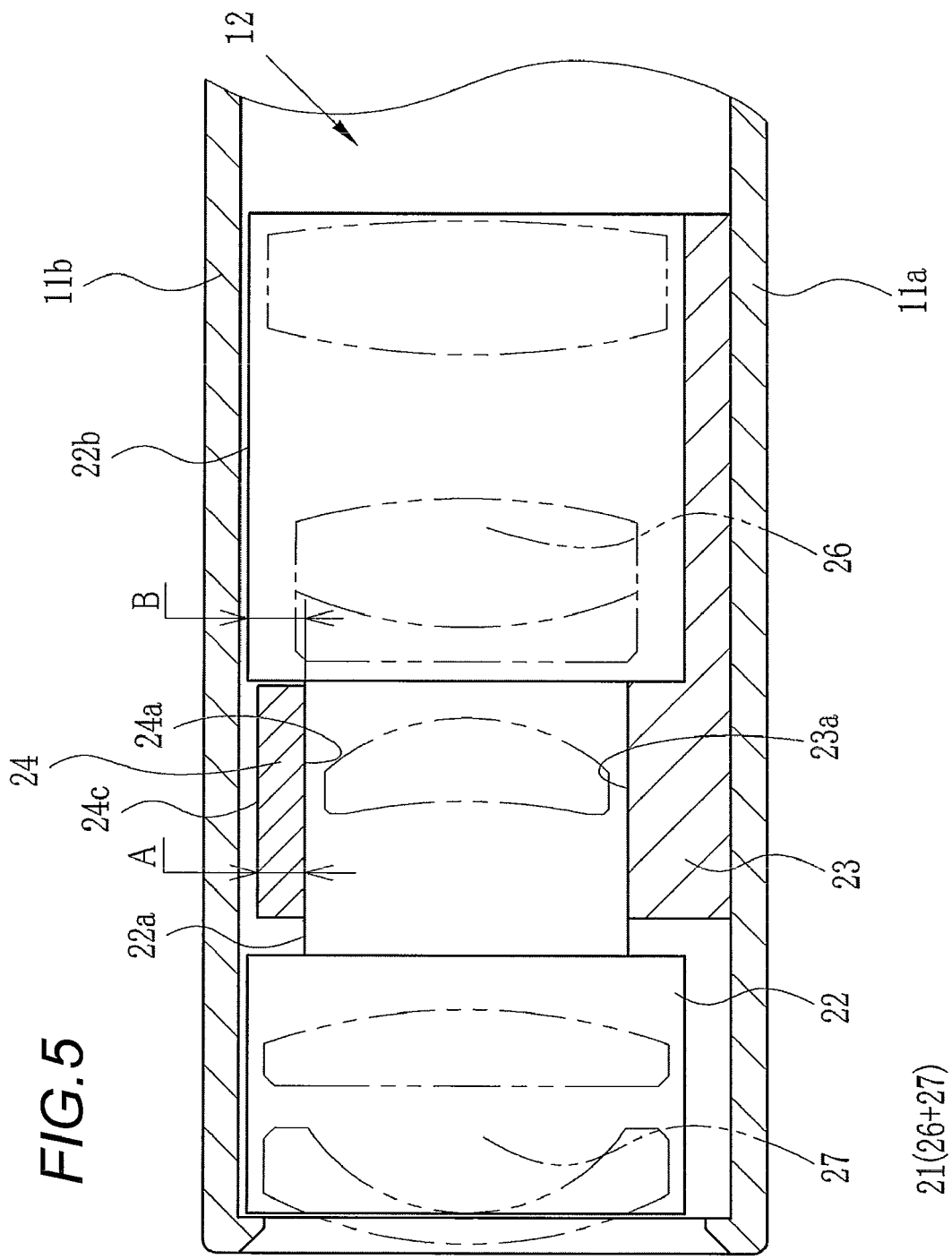
FIG. 5 is a side view of the projection lens unit.
Figure 6:
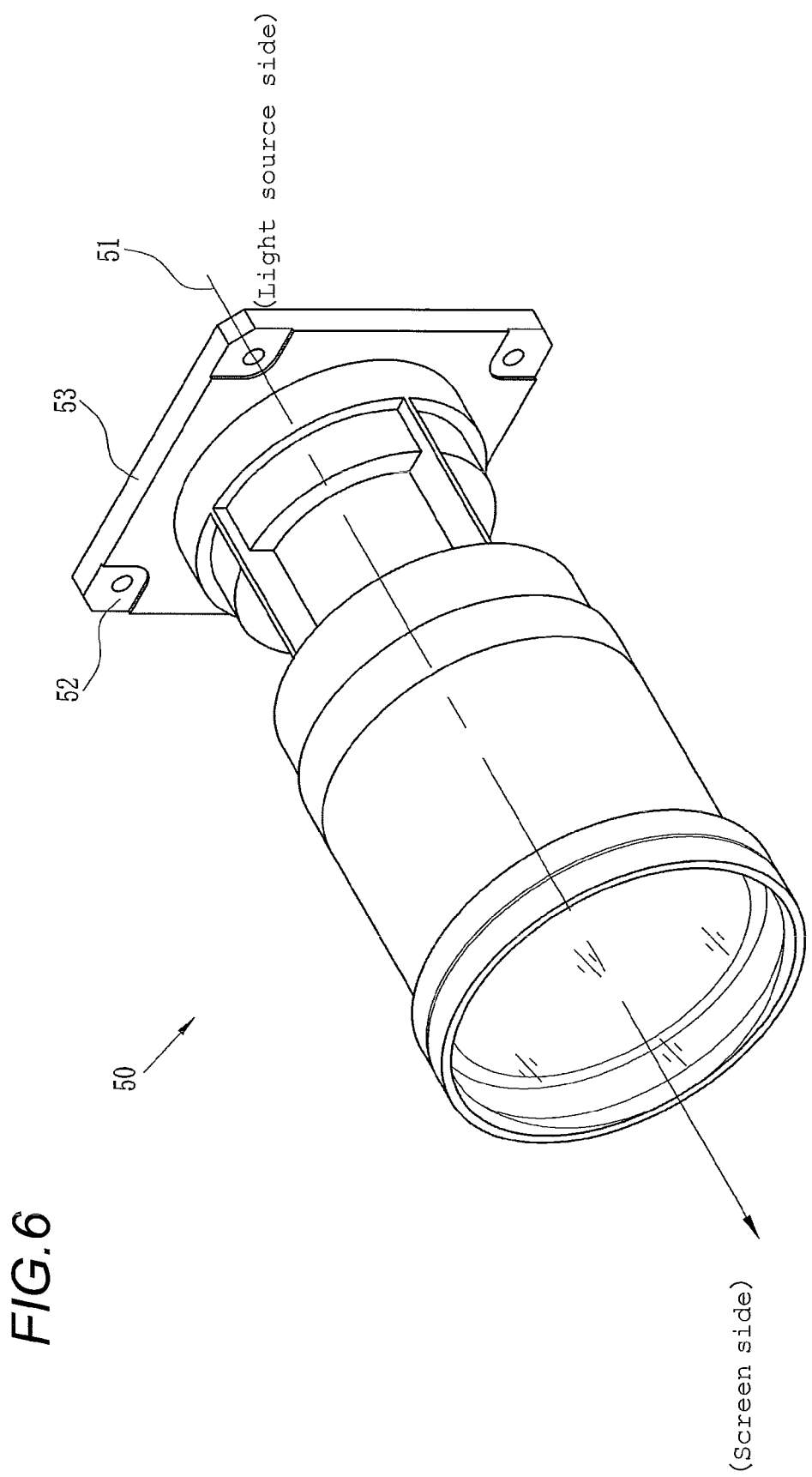
FIG. 6 is a perspective appearance view of the related projection lens unit.

As shown in FIGS. 2 and 3, the projection lens unit 12 includes: a lens barrel member 22 for accommodating a projection lens 21 to magnify and project image light on a screen; a holding member 23 having a first holding face 23a on which the lens barrel member 22 is mounted and held; and a presser member 24 having a second holding face 24a, wherein the lens barrel member 22 is interposed between the first holding face 23a and the second holding face 24a. The presser member 24 is fixed to the holding member 23 by a screw 25 screwed to a screw hole 23b formed in the holding member 23. The holding member 23 is mounted on the housing 11 by screws not shown in the drawing. A lower face of the holding member 23 is tightly put on a bottom plate 11a (shown in FIG. 5) of the housing 11.

Figure 4:
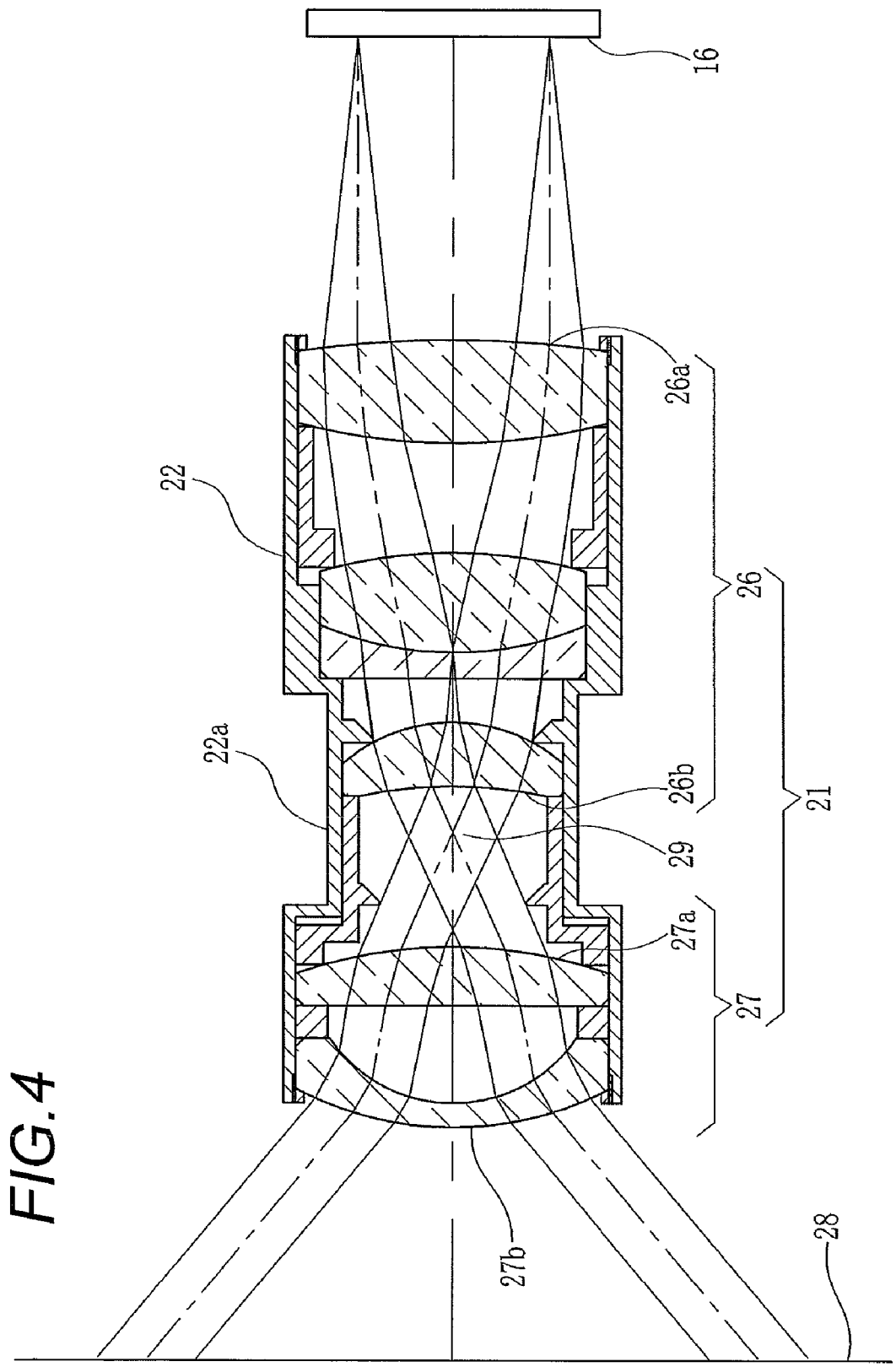
FIG. 4 is a sectional view showing a projection lens barrel.

As shown in FIG. 4, the projection lens 21 includes: a first optical system 26 on which image light emitted from the LCD 16 is incident and which focuses the incident image light; and a second optical system 27 which magnifies the image light focused by the first optical system 26 and projects the magnified image light on a screen 28. The first and the second optical system 26, 27 are composed as follows. The image light incident on the incident face 26a of the first optical system 26 is emergent from the emergent face 26b and once focused. After that, the image light is incident on the incident face 27a of the second optical system 27 and magnified and emergent from the emergent face 27b to the screen 28. Between the emergent face 26b, which is a joining face of the first and the second optical system 26, 27, and the incident face 27a, the pupil portion 29 is formed in which the image light is most focused. The first and the second optical system 26, 27 compose a fixed focus optical system in which the focal distance of the lens is not varies. Therefore, the pupil portion 29 is not moved. Accordingly, a position, at which a luminous flux becomes thinnest, is fixed. The lens barrel member 22 accommodates a plurality of lenses composing the first and the second optical system 26, 27. Further, a diameter of the portion of the lens barrel member 22, in which the pupil portion 29 is contained, can be reduced. Due to the foregoing, the small diameter portion 22a can be formed at the substantial center of the lens barrel member 22.

The projection lens unit 12 is incorporated into the housing 11 as follows. The holding member 23 is incorporated into the housing 11 together with the illumination optical system 14, the total internal reflection prism 15 and the LCD 16 and fixed so that it can be tightly contacted with the bottom plate 11a (shown in FIG. 5) of the housing 11. As shown in FIG. 3, the small diameter portion 22a of the lens barrel member 22 is put on the first holding face 23a of the holding member 23 fixed on the bottom plate 11a. A lower half portion of the small diameter portion 22a is supported by the first holding face 23a. The presser member 24 is put on the holding member 23 so that the small diameter portion 22a can be interposed between the presser member 24 and the holding member 23. Then the presser member 24 is fixed to the holding member 23 by the screw 25 inserted into the fixing groove 24b. The second holding face 24a formed on the presser member 24 supports the major part of the upper half portion of the small diameter portion 22a so that the small diameter portion 22a can be interposed and fixed between the first holding face 23a and the second holding face 24a. In this way, the projection lens unit 12 is incorporated into the housing 11. The maximum outline portion 22b of the lens barrel member 22, which has been incorporated, is accommodated in the housing 11 while a small gap is being left between the lens barrel member 22 and the upper plate 11b (shown in FIG. 5) of the housing 11. In this case, as shown in FIG. 3, the presser member 24 is formed in such a manner that the thickness A of the central portion of the second holding face 24a is smaller than the step size B between the small diameter portion 22a of the lens barrel member 22 and the maximum outline portion 22b. Therefore, the upper face 24c of the presser member 24 neither protrudes upward from the maximum outline portion 22b nor comes into contact with the upper plate 11b of the housing 11. The method described above in which the small diameter portion 22a of the lens barrel member 22 is interposed and fixed between the holding member 23 and the presser member 24 can be realized without increasing the size of the housing 11.

The projection lens unit 12 described above may be incorporated into the housing 11 by the following method. First of all, the projection lens unit 12 shown in FIG. 2 is assembled by the same method as that described before. The small diameter portion 22a of the lens barrel member 22 is interposed between the holding member 23 and the presser member 24 so as to integrate the lens barrel member 22, the holding member 23 and the presser member 24 into one body. After that, the projection lens unit 12 is incorporated into the housing 11 together with the illumination optical system 14, the total internal reflection prism 15 and the LCD 16. In this case, the holding member 23 may be fixed to the bottom plate 11a of the housing 11 by screws so that the holding member 23 can be substantially tightly contacted with the bottom plate 11a.

It is preferable that the projection lens 21 is a fixed focus lens. However, as long as it is an optical system in which a position of the pupil portion 29 is not moved by a long distance, it is possible to use a variable magnification lens, the focal distance of which can be changed.

The above embodiment is explained in the case where the present invention is applied to the portable type small projector 10. However, it should be noted that the use of the projection lens unit of the present invention is not limited to the projector exclusively used for projection. It is possible to apply the present invention to any portable type electronic device. For example, it is possible to apply the present invention to a digital camera having a function of projection display or a mobile phone.

What is claimed is:

1. A projection lens unit comprising:
   a projection lens that projects an image on a screen after incident image light has been focused and magnified;
   a lens barrel member that accommodates the projection lens, wherein an outline portion of the lens barrel member corresponding to a position where the image light has been focused is formed to be thinnest;
   a holding member that has a first holding face on which the outline portion of the lens barrel member formed to be thinnest is mounted; and
   a presser member that has a second holding face for holding the outline portion of the lens barrel member formed to be thinnest when the outline portion of the lens barrel member is interposed between the first holding face and the second holding face,
   wherein the lens barrel member has an outline portion which is provided at a light incident side of the position where the image light has been focused and is thicker than the outline portion corresponding to the position where the image light has been focused, and the lens barrel member has an outline portion which is provided at a light output side of the position where the image light has been focused and is thicker than the outline portion corresponding to the position where the image light has been focused.

2. The projection lens unit according to claim 1, the projection lens including: a first optical system that focuses incident image light; and a second optical system that magnifies and projecting the focused image light on the screen, wherein a pupil position at which the image light is focused exists between the first optical system and the second optical system and the outline portion of the lens barrel member formed to be thinnest contains the pupil position.

3. The projection lens unit according to claim 1, wherein the projection lens is a fixed focus lens in which a ratio of the projection distance to the size of the projection image is constant.

* * * * *